(12) United States Patent
Udatsu et al.

(10) Patent No.: US 9,248,403 B2
(45) Date of Patent: Feb. 2, 2016

(54) CARBON DIOXIDE RECOVERY DEVICE AND CARBON DIOXIDE RECOVERY METHOD

(71) Applicant: Kabushiki Kaisha Toshiba, Tokyo (JP)

(72) Inventors: Mitsuru Udatsu, Kanagawa (JP); Hideo Kitamura, Tokyo (JP); Masatoshi Hodotsuka, Saitama (JP); Satoshi Saito, Kanagawa (JP); Kensuke Suzuki, Kanagawa (JP); Noriko Chiba, Kanagawa (JP); Haruki Fujimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 301 days.

(21) Appl. No.: 13/921,450

(22) Filed: Jun. 19, 2013

(65) Prior Publication Data

US 2013/0343976 A1 Dec. 26, 2013

(30) Foreign Application Priority Data

Jun. 20, 2012 (JP) ................................. 2012-138594
May 24, 2013 (JP) ................................. 2013-110134

(51) Int. Cl.
*B01D 53/62* (2006.01)
*B01D 53/14* (2006.01)
*B01D 53/18* (2006.01)

(52) U.S. Cl.
CPC ............ *B01D 53/62* (2013.01); *B01D 53/1412* (2013.01); *B01D 53/1475* (2013.01);
(Continued)

(58) Field of Classification Search
CPC ........... B01D 53/1406; B01D 53/1412; B01D 53/1475; B01D 53/78; B01D 53/62; B01D 2257/504
See application file for complete search history.

(56) References Cited

U.S. PATENT DOCUMENTS

| 5,603,908 A | 2/1997 | Yoshida et al. |
| 2002/0059865 A1 | 5/2002 | Lemaire et al. |

(Continued)

FOREIGN PATENT DOCUMENTS

| JP | 2010-100491 | 5/2010 |
| JP | 2011-042554 | 3/2011 |
| WO | 2012067101 A1 | 5/2012 |

OTHER PUBLICATIONS

Partial European Search Report dated Sep. 26, 2013, issued in European counterpart Application No. 13172876.8, 8 pages.

(Continued)

*Primary Examiner* — Timothy Vanoy
(74) *Attorney, Agent, or Firm* — Patterson & Sheridan, LLP

(57) ABSTRACT

According to one embodiment, a carbon dioxide recovery device includes an absorption tower configured to cause carbon dioxide-containing gas to come in contact with absorbing solution and to generate rich solution absorbing the carbon dioxide, a regeneration tower configured to heat the rich solution, to disperse steam containing the carbon dioxide, and to generate lean solution from which the carbon dioxide is removed, a heat exchanging device configured to exchange heat between the lean solution and the rich solution, to supply the rich solution after the heat exchange to the regeneration tower, and to supply the lean solution after the heat exchange to the absorption tower, and a cooling device configured to cool a part of the rich solution discharged from a first place of the absorption tower and to supply the cooled rich solution to a second place higher than the first place of the absorption tower.

12 Claims, 8 Drawing Sheets

(52) U.S. Cl.
CPC ............. *B01D53/1425* (2013.01); *B01D 53/18* (2013.01); *B01D 2257/504* (2013.01); *Y02C 10/04* (2013.01); *Y02C 10/06* (2013.01)

(56) References Cited

U.S. PATENT DOCUMENTS

| | | |
|---|---|---|
| 2008/0307968 A1 | 12/2008 | Kang et al. |
| 2011/0041685 A1 | 2/2011 | Tanaka et al. |
| 2011/0067567 A1 | 3/2011 | Kozak et al. |
| 2011/0120309 A1* | 5/2011 | Baburao et al. ................. 95/199 |
| 2011/0135550 A1 | 6/2011 | Nagayasu et al. |
| 2011/0195005 A1 | 8/2011 | Hooper et al. |
| 2012/0067219 A1 | 3/2012 | Ogawa et al. |
| 2013/0251601 A1* | 9/2013 | Baburao et al. ............... 422/198 |

OTHER PUBLICATIONS

Australian Office Action dated Dec. 22, 2014, filed in Australian counterpart Application No. 2013206428, 3 pages.
Chinese Office Action dated Dec. 23, 2014, filed in Chinese counterpart Application No. 201310247162.0, 27 pages (with translation).
Extended European Search Report dated Jan. 8, 2015, issued in European counterpart Application No. 14185072.7, 8 pages.
Extended European Search Report dated Jan. 7, 2014, issued in European counterpart Application No. 13172876.8, 12 pages.
Chinese Office Action dated Jun. 23, 2015, filed in Chinese counterpart Application No. 201310247162.0, 23 pages.

* cited by examiner

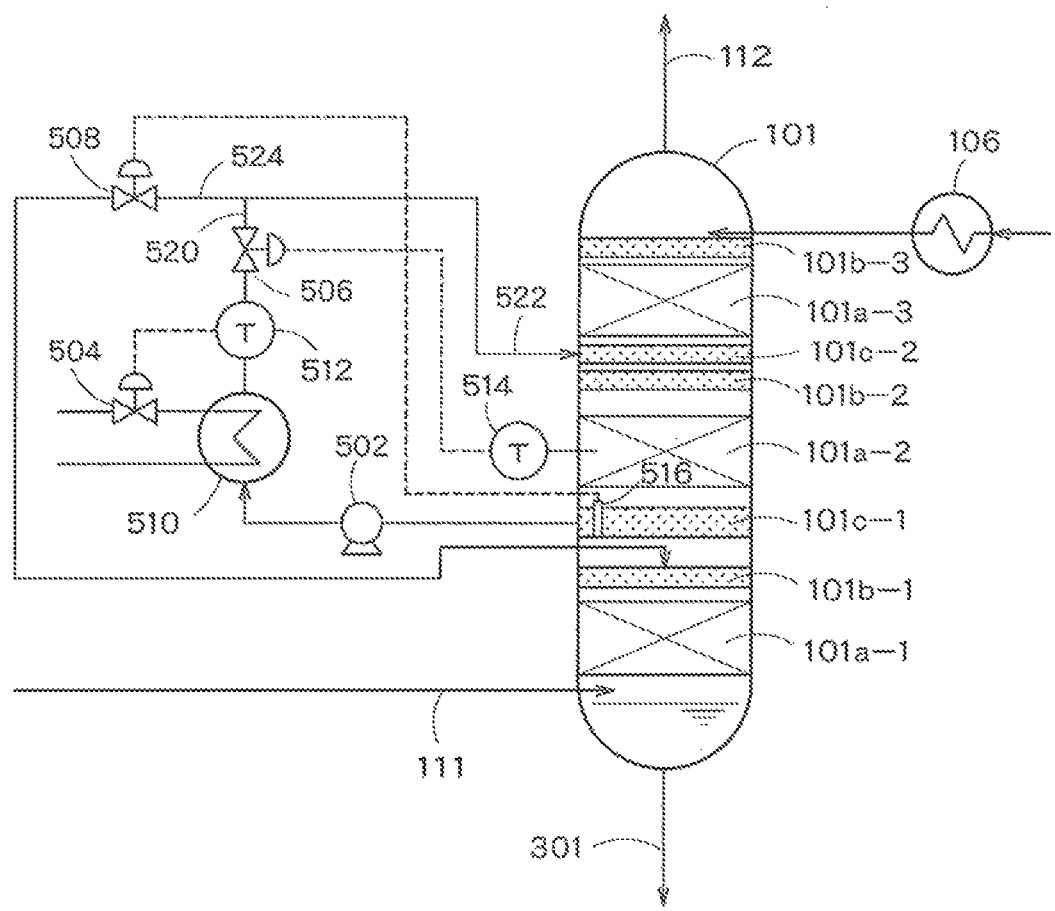
F I G. 8

CARBON DIOXIDE RECOVERY DEVICE AND CARBON DIOXIDE RECOVERY METHOD

CROSS REFERENCE TO RELATED APPLICATIONS

This application is based upon and claims the benefit of priority from the prior Japanese Patent Application No. 2012-138594, filed on Jun. 20, 2012, and Japanese Patent Application No. 2013-110134, filed on May 24, 2013, and the entire contents of which are incorporated herein by reference.

FIELD

Embodiments described herein relate generally to a carbon dioxide recovery device and a carbon dioxide recovery method.

BACKGROUND

In recent years, with regard to recovery of carbon dioxide, carbon dioxide recovery storage technique attracts attention as an effective measure against problem of global warming which is worried about in global scale. In particular, for thermal power plants and process exhaust gas, a method for recovering carbon dioxide using aqueous solution has been studied. For example, a carbon dioxide recovery device is known, which includes an absorption tower and a regeneration tower. The absorption tower generates rich solution by absorbing carbon dioxide-containing gas to absorbing solution. The regeneration tower disperses and separates the carbon dioxide with steam by heating the rich solution discharged from the absorption tower, and returns the generated lean solution back to the absorption tower.

However, in the conventional carbon dioxide recovery device, when carbon dioxide-containing gas is provided to the absorption tower at the start of operation, rapid heating occurs in the absorbing solution because of carbon dioxide absorption reaction, and there is a problem in that abnormally high temperature may damage the absorption tower equipment or may degrade the absorbing solution. This problem occurs not only at the start of operation but also when the carbon dioxide content in the exhaust gas rapidly increases.

BRIEF DESCRIPTION OF THE DRAWINGS

FIG. 8 is a schematic configuration diagram illustrating a carbon dioxide recovery device according to a fourth embodiment.

DETAILED DESCRIPTION

According to one embodiment, a carbon dioxide recovery device includes an absorption tower configured to cause carbon dioxide-containing gas to come in contact with absorbing solution and to generate rich solution absorbing the carbon dioxide, a regeneration tower configured to heat the rich solution, to disperse steam containing the carbon dioxide, and to generate lean solution from which the carbon dioxide is removed, a heat exchanging device configured to exchange heat between the lean solution and the rich solution, to supply the rich solution after the heat exchange to the regeneration tower, and to supply the lean solution after the heat exchange to the absorption tower, and a cooling device configured to cool a part of the rich solution discharged from a first place of the absorption tower and to supply the cooled rich solution to a second place higher than the first place of the absorption tower.

Embodiments will now be explained with reference to the accompanying drawings.

(First Embodiment)

Figure 1:
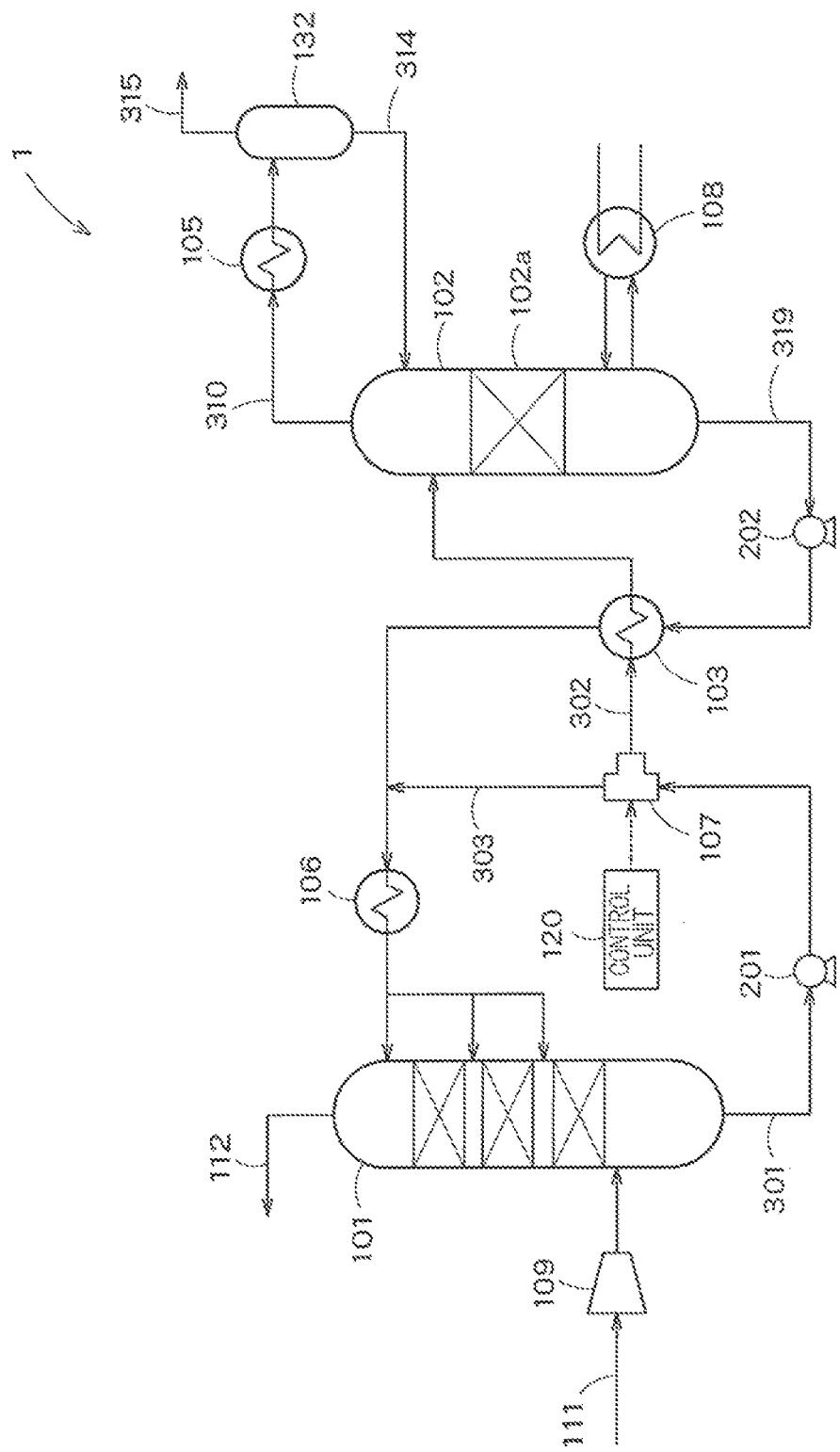
FIG. 1 is a schematic configuration diagram illustrating a carbon dioxide recovery device according to a first embodiment.

FIG. 1 illustrates a schematic configuration of a carbon dioxide recovery device according to the first embodiment. A carbon dioxide recovery device 1 includes an absorption tower 101, a regeneration tower 102, a regenerative heat exchange device 103, cooling devices 105, 106, a reboiler 108, and a gas-liquid separation device 132, which are main constituent elements. Further, the carbon dioxide recovery device 1 includes pumps 201, 202, a diversion device 107, a blower 109, and a control unit 120.

In the absorption tower 101, carbon dioxide-containing gas 111 is introduced via the blower 109, and comes into contact with the absorbing solution absorbing the carbon dioxide, and as a result, rich solution 301 is generated by absorbing the carbon dioxide.

In this case, the absorption tower 101 is made of, for example, a countercurrent flow type gas-liquid contact device, and is configured to cause the carbon dioxide-containing gas 111 provided from the bottom portion to come into gas-liquid contact with the absorbing solution which flows down from the upper portion.

The carbon dioxide-containing gas 111 provided to the absorption tower 101 is not particularly limited, but, for example, the carbon dioxide-containing gas 111 may be combustion exhaust gas, process exhaust gas, and the like, and as necessary, it may be introduced after cooling treatment.

The absorbing solution is not particularly limited. For example, amine-based aqueous solution such as monoethanolamine (MEA) and diethanolamine (DEA) may be used. Carbon dioxide-removed gas 112 from which the carbon dioxide is removed by the absorption tower 101 is discharged from the upper portion of the absorption tower 101.

The rich solution 301 discharged from the absorption tower 101 is given via the pump 201 to the diversion device 107, and is diverted into rich solutions 302, 303 with a desired flow ratio. The diversion ratio of the diversion device 107 is controlled by the control unit 120.

The rich solution 302 is introduced into the heat exchanging device 103, and is heated by the lean solution 319 to a desired temperature. The heated rich solution 302 is provided to the regeneration tower 102.

The regeneration tower 102 includes a packed bed 102a, and the rich solution 302 provided from the regenerative heat exchange device 103 is heated, whereby most of the carbon dioxide is dispersed and separated with steam and discharged as carbon dioxide-containing steam 310 from the upper portion, and the lean solution 319 from which most of the carbon dioxide has been removed is returned back to the absorption tower 101.

The regeneration tower 102 is, for example, a countercurrent flow type gas-liquid contact device, and the stored liquid is heated by heat-exchange with high-temperature steam which is an externally provided heat by the reboiler 108.

The carbon dioxide-containing steam 310 discharged from the regeneration tower 102 is cooled by a cooling medium such as cool water provided from the outside by the cooling device 105, and thereafter, it is separated into carbon dioxide gas 315 and water 314 by a gas-liquid separation device 132. The water 314 is returned back to the regeneration tower 102 as necessary.

The regenerative heat exchange device 103 is provided in a path in which the lean solution 319 is provided from the regeneration tower 102 to the absorption tower 101. The lean solution 319 discharged from the regeneration tower 102 is provided via the pump 202 to the regenerative heat exchange device 103. The lean solution 319 exchanges heat with the rich solution 302 in the regenerative heat exchange device 103.

The rich solution 303 diverted by the diversion device 107 and the lean solution 319 having been subjected to the heat exchange in the regenerative heat exchange device 103 are cooled by the cooling medium such as cooling water provided from the outside by the cooling device 106, and thereafter they are returned back to the absorption tower 101. In the present embodiment, as illustrated in FIG. 1, the cooled rich solution 303 and the cooled lean solution 319 are provided from the three positions of the absorption tower 101. Alternatively, they may be provided from two or less positions, or four or more positions.

Subsequently, a carbon dioxide recovery method based on the carbon dioxide recovery device 1 thus configured will be explained.

First, before the carbon dioxide-containing gas 111 is provided to the absorption tower 101, the diversion ratio at the diversion device 107 is set at a predetermined diversion ratio. For example, the diversion ratio is set such that the flow rate (the flow rate of the rich solution 303) to the cooling device 106 is more than the flow rate (the flow rate of the rich solution 302) to the regenerative heat exchange device 103.

Subsequently, the carbon dioxide-containing gas 111 is begun to be provided to the absorption tower 101. A portion of the rich solution 301 having absorbed the carbon dioxide in the absorption tower 101 is provided via the diversion device 107 and the cooling device 106 to the absorption tower 101. More specifically, a portion of the absorbing solution circulates through the absorption tower 101, the diversion device 107, and the cooling device 106. Therefore, less reactive absorbing solution that includes much carbon dioxide and that cannot absorb much carbon dioxide is continuously provided to the absorption tower 101 at a low temperature. Accordingly, this can prevent rapid heat generation in the absorbing solution due to the carbon dioxide absorption reaction in the absorption tower 101.

It should be noted that the temperature of the absorbing solution in the absorption tower 101 is preferably equal to or less than 70° C. in order to reduce degradation of the absorbing solution due to components such as oxygen included in the carbon dioxide-containing gas. Further, in order to prevent damage of equipment of the absorption tower 101, the difference between the maximum temperature in the absorption tower 101 and the temperature of the absorbing solution provided to the absorption tower 101 is preferably equal to or less than 30° C.

The heat generation in the absorption tower 101 can also be suppressed by reducing the amount of carbon dioxide-containing gas 111 provided therein when starting to provide the carbon dioxide-containing gas 111, but this would increase the time it takes to activate the plant. Therefore, the ratio of the absorbing solution circulation mass flow rate (the mass flow rate of the rich solution 303) and the carbon dioxide-containing gas mass flow rate is preferably equal to or more than 0.5, and more preferably, 4 to 6. With such flow ratio, while it is possible to prevent the increase of the time it takes to activate the plant, the heat generation in the absorption tower 101 can be effectively suppressed.

After a predetermined period of time passes since starting to provide the carbon dioxide-containing gas 111, the diversion ratio of the diversion device 107 is adjusted to gradually increase the flow rate of the rich solution 302, and at the same time, the flow rate of the rich solution 303 is gradually reduced. Then, normal operation state is attained in which all the rich solution 301 is provided to the regenerative heat exchange device 103. In the normal operation state, all the rich solution 301 discharged from the absorption tower 101 is provided to the regenerative heat exchange device 103, and after heated by the lean solution 319, it is provided to the regeneration tower 102. In the regeneration tower 102, the reboiler 108 heats the absorbing solution to disperse the carbon dioxide, and moves upward as carbon dioxide-containing steam. The carbon dioxide-containing steam 310 is discharged from the upper portion of the regeneration tower 102, and on the other hand, the lean solution 319 is returned back to the absorption tower 101. As described above, regeneration step is performed to make the rich solution 301 having absorbed the carbon dioxide into the lean solution 319. The lean solution 319 discharged from the regeneration tower 102 passes through the regenerative heat exchange device 103 and the cooling device 106 to be provided to the absorption tower 101. The lean solution 319 regenerated by the regeneration tower 102 is provided to the absorption tower 101, and therefore, the carbon dioxide can be absorbed efficiently from the carbon dioxide-containing gas 111.

As described above, according to the present embodiment, when the carbon dioxide recovery device 1 starts to operate (when the carbon dioxide-containing gas 111 is begun to be provided), a portion of the rich solution 301 is not provided to the regeneration tower 102, and is returned back to the absorption tower 101 via the diversion device 107 and the cooling device 106. Therefore, the carbon dioxide content in the absorbing solution provided to the absorption tower 101 is quickly enhanced, and the reaction activity of the absorbing solution is reduced, so that this can prevent rapid heat generation in the absorbing solution in the absorption tower 101.

In the above embodiment, when the carbon dioxide-containing gas 111 is begun to be provided, a portion of the rich solution 301 is provided to the absorption tower 101 via the diversion device 107 and the cooling device 106. Alternatively, the amount of diversion of the rich solution 302 at the diversion device 107 may be set at zero, and all the rich solution 301 may circulate in the absorption tower 101, the diversion device 107, and the cooling device 106.

In the above embodiment, in the normal operation state, all the rich solution 301 discharged from the absorption tower 101 is provided to the regenerative heat exchange device 103. However, the amount of diversion of the rich solution 303 at the diversion device 107 may not be zero. However, the flow rate of the rich solution 303 in the normal operation state is less than the flow rate of the rich solution 303 when the carbon dioxide-containing gas 111 is begun to be provided.

Figure 2:
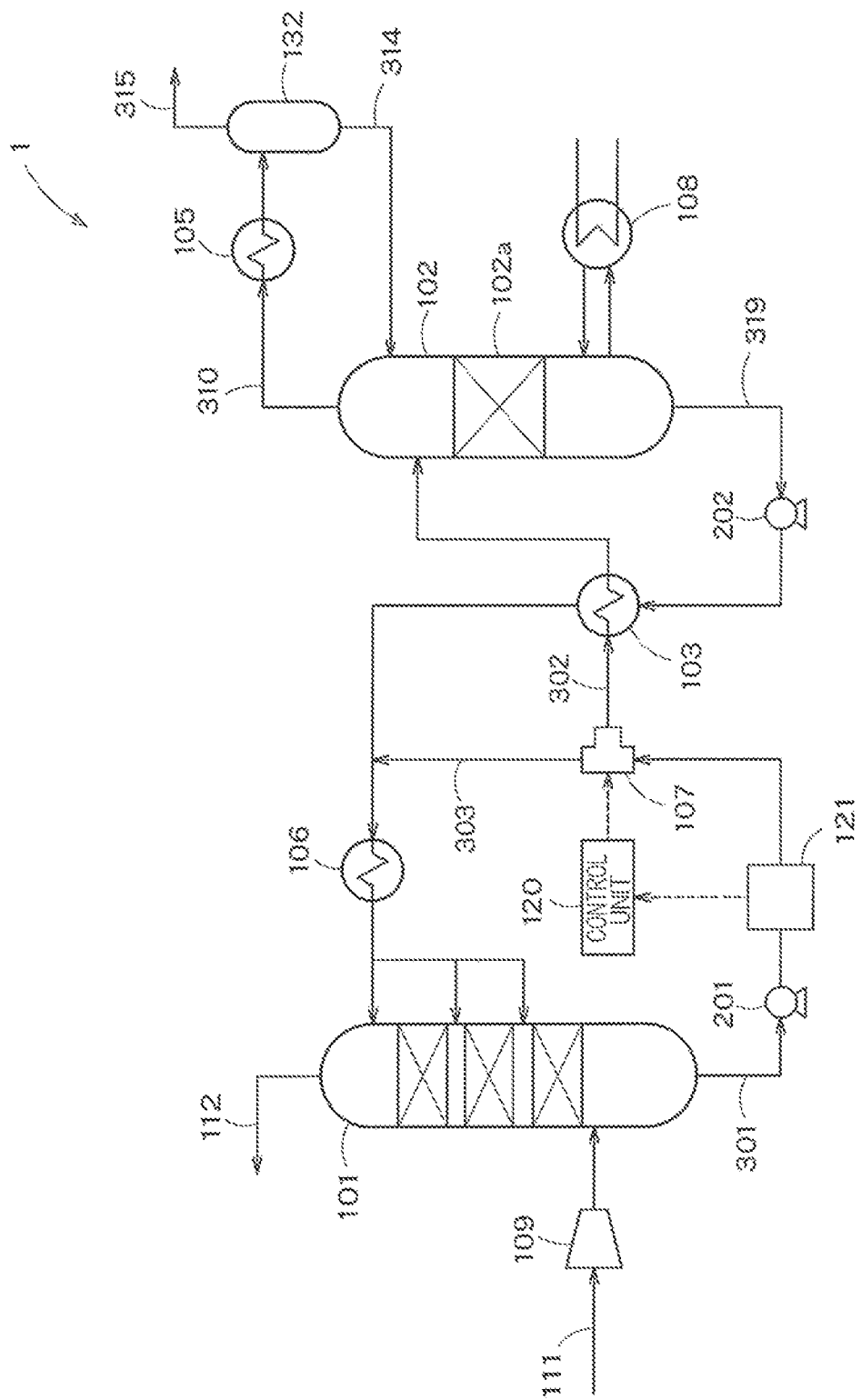
FIG. 2 is a schematic configuration diagram illustrating a carbon dioxide recovery device according to a modification.

As illustrated in FIG. 2, a densimeter 121 for measuring the density of the rich solution 301 may be provided between the absorption tower 101 and the diversion device 107. The carbon dioxide content of the rich solution 301 is derived from the density of the rich solution 301. The control unit 120 derives the carbon dioxide content of the rich solution 301 from the measurement result of the densimeter 121, and adjusts the diversion ratio of the diversion device 107. For example, the control unit 120 may monitor the carbon dioxide content of the rich solution 301 from when the carbon dioxide-containing gas 111 is begun to be provided, and when the carbon dioxide content of the rich solution 301 is equal to or more than predetermined value, or after a predetermined period of time passes since it becomes equal to or more than the predetermined value, the reaction activity of the absorbing solution is determined to be sufficiently low, and the flow rate of the rich solution 302 is gradually increased and at the same time the flow rate of the rich solution 303 is gradually decreased, so that switching to the normal operation state is done.

Figure 3:
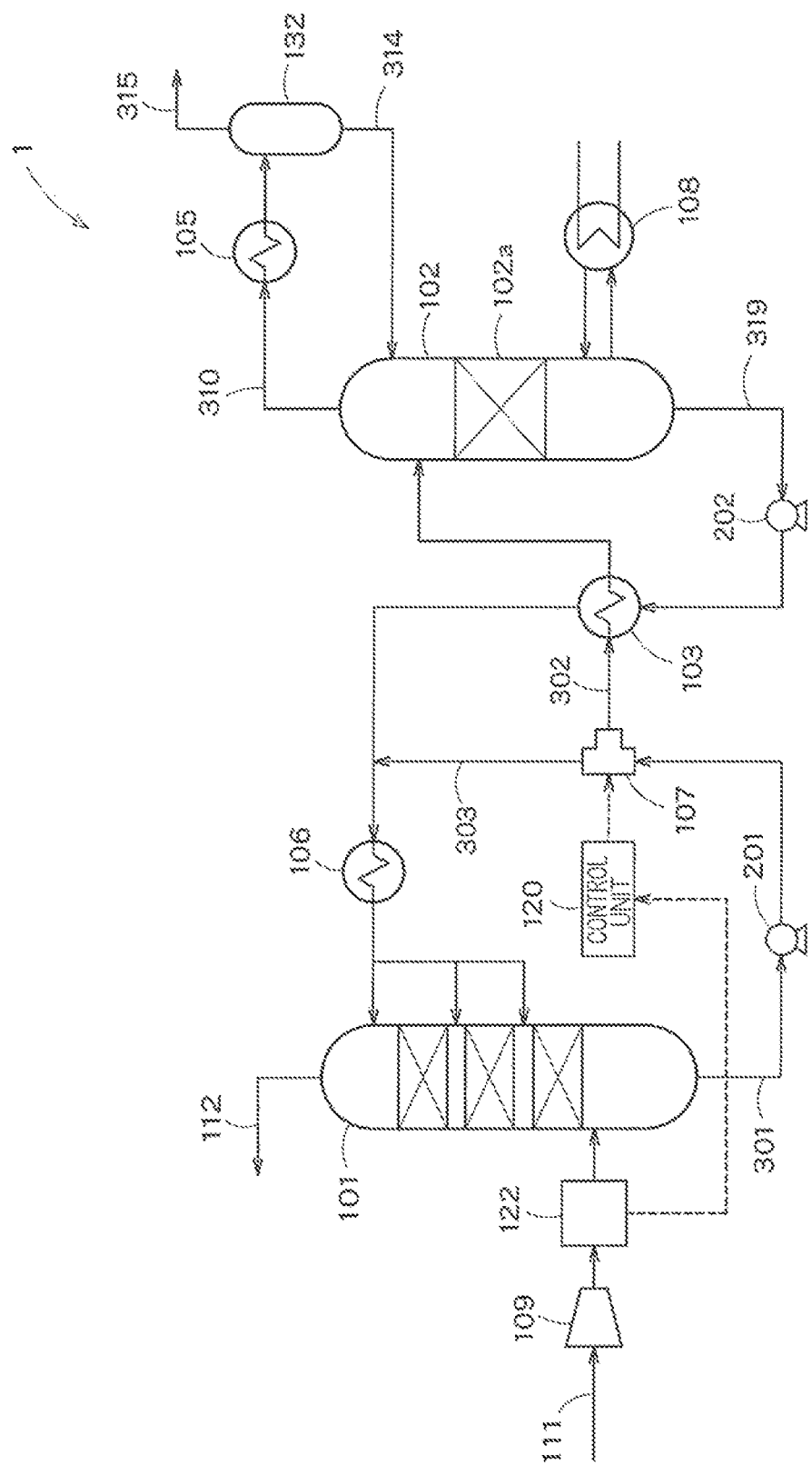
FIG. 3 is a schematic configuration diagram illustrating a carbon dioxide recovery device according to a modification.

Further, as illustrated in FIG. 3, a concentration meter 122 for measuring the carbon dioxide concentration of the carbon dioxide-containing gas 111 may be provided. The control unit 120 adjusts the diversion ratio of the diversion device 107 on the basis of the measurement result of the concentration meter 122. For example, control unit 120, when the carbon dioxide concentration of the carbon dioxide-containing gas 111 rapidly increases in the normal operation state, the flow rate of the rich solution 303 is increased, and the flow rate of the rich solution 302 is decreased. By doing such diversion ratio adjustment, rapid heat generation in the absorbing solution can be prevented in the absorption tower 101.

The carbon dioxide recovery device 1 may be provided with both of the densimeter 121 and the concentration meter 122.

(Second Embodiment)

Figure 4:
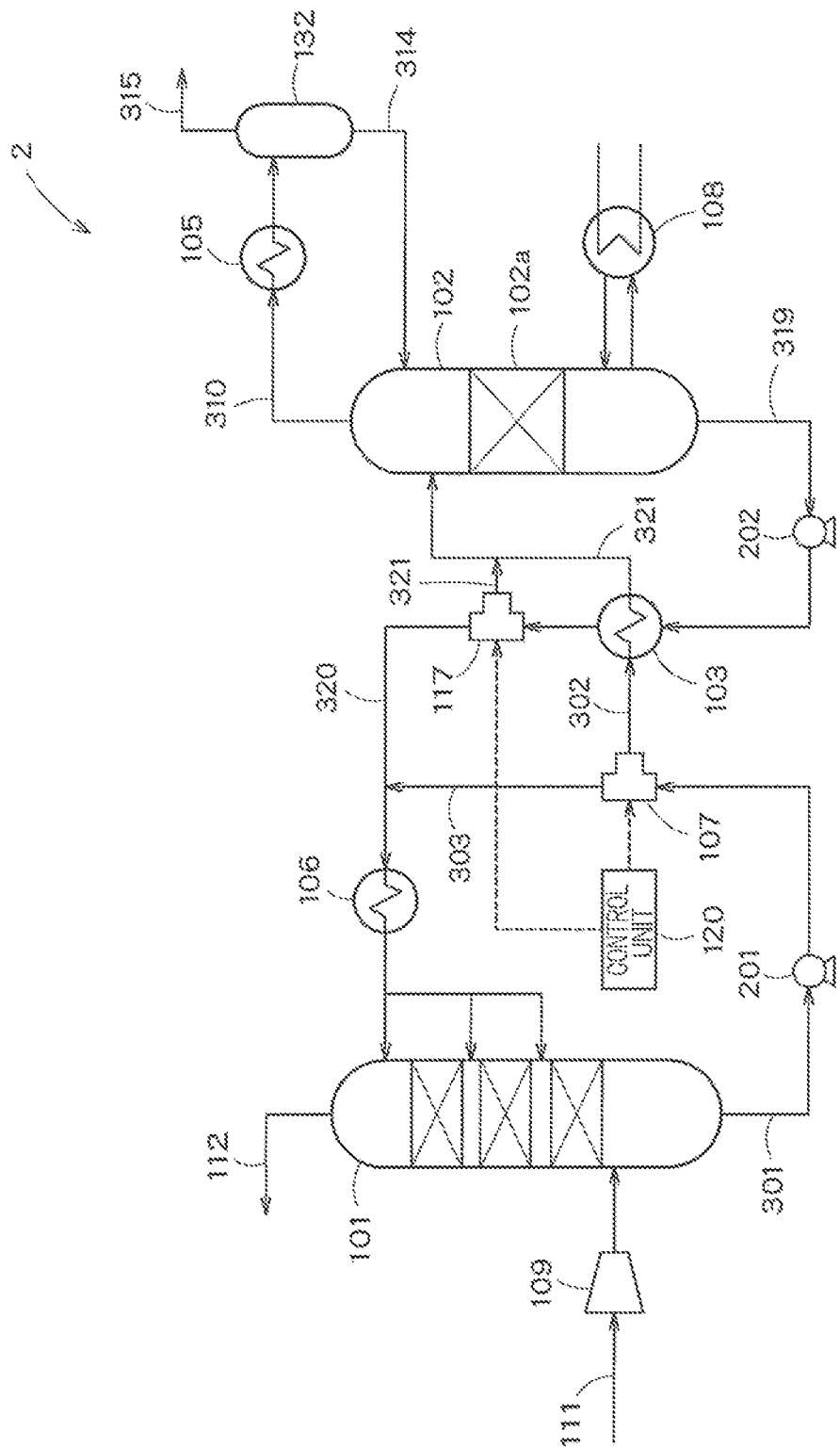
FIG. 4 is a schematic configuration diagram illustrating a carbon dioxide recovery device according to a second embodiment.

FIG. 4 illustrates a schematic configuration of a carbon dioxide recovery device 2 according to the second embodiment. When the carbon dioxide recovery device 2 is compared with the carbon dioxide recovery device 1 according to the first embodiment as illustrated in FIG. 1, the carbon dioxide recovery device 2 is different in that it has a diversion device 117. The configuration and operation other than that is the same as those of the first embodiment, and description thereabout is omitted.

The diversion device 117 diverts the lean solution 319 discharged from the regeneration tower 102 to the lean solutions 320, 321 with a desired flow ratio. The diversion ratio of the diversion device 117 is controlled by the control unit 120. The lean solution 320 is cooled by the cooling device 106, and is provided to the absorption tower 101. The lean solution 321 is returned back to the regeneration tower 102.

Subsequently, a carbon dioxide recovery method based on the carbon dioxide recovery device 2 thus configured will be explained.

First, before the carbon dioxide-containing gas 111 is provided to the absorption tower 101, the diversion ratio at the diversion devices 107, 117 is set at a predetermined diversion ratio. For example, in the diversion device 107, the diversion ratio is set such that the flow rate (the flow rate of the rich solution 303) to the cooling device 106 is more than the flow rate (the flow rate of the rich solution 302) to the regenerative heat exchange device 103. On the other hand, for example, in the diversion device 117, the diversion ratio is set such that the flow rate to the regeneration tower 102 (the flow rate of the lean solution 321) is more than the flow rate to the cooling device 106 (the flow rate of the lean solution 320).

Subsequently, the carbon dioxide-containing gas 111 is begun to be provided to the absorption tower 101. A portion of the rich solution 301 having absorbed the carbon dioxide in the absorption tower 101 is provided via the diversion device 107 and the cooling device 106 to the absorption tower 101. More specifically, a portion of the absorbing solution circulates through the absorption tower 101, the diversion device 107, and the cooling device 106. Therefore, less reactive absorbing solution that includes much carbon dioxide and that cannot absorb much carbon dioxide is continuously provided to the absorption tower 101 at a low temperature. Accordingly, this can prevent rapid heat generation in the absorbing solution due to the carbon dioxide absorption reaction in the absorption tower 101.

With the diversion device 117, a portion of the lean solution 319 discharged from the regeneration tower 102 is heat-exchanged with the rich solution 302 in the regenerative heat exchange device 103, and thereafter, it is in the circulation state again to be provided to the regeneration tower 102. At this occasion, with the heat generated by absorption reaction of the carbon dioxide in the absorption tower 101, the absorbing solution in the absorption tower 101 is heated to a temperature equal to or more than the outside air temperature or the temperature before activation of the carbon dioxide recovery device 2, and discharged from the absorption tower 101. The lean solution 319 discharged from the regeneration tower 102 is heat-exchanged with the heated rich solution 302 in the regenerative heat exchange device 103, and the temperature thereof is raised. The diversion device 117 returns a portion of the heated lean solution 319 (lean solution 321) back to the regeneration tower 102, so that the inside of the regeneration tower 102 can be heated.

Then, after a predetermined period of time passes since starting to provide the carbon dioxide-containing gas 111, the diversion ratio of the diversion device 107 is adjusted to gradually increase the flow rate of the rich solution 302, and at the same time, the flow rate of the rich solution 303 is gradually reduced. The diversion ratio of the diversion device 117 is adjusted to gradually increase the flow rate of the rich solution 320, and at the same time, the flow rate of the lean solution 321 is gradually reduced. Then, normal operation state is attained in which all the rich solution 301 is provided to the regenerative heat exchange device 103, and all the lean solution 319 is provided to the cooling device 106. In the normal operation state, all the rich solution 301 discharged from the absorption tower 101 is provided to the regenerative heat exchange device 103, and after heated by the lean solution 319, it is provided to the regeneration tower 102.

As described above, according to the present embodiment, when the carbon dioxide recovery device 2 starts to operate (when the carbon dioxide-containing gas 111 is begun to be provided), a portion of the rich solution 301 is not provided to the regeneration tower 102, and is returned back to the absorption tower 101 via the diversion device 107 and the cooling device 106. Therefore, the carbon dioxide content in the absorbing solution provided to the absorption tower 101 is quickly enhanced, and the reaction activity of the absorbing solution is reduced, so that this can prevent rapid heat generation in the absorbing solution in the absorption tower 101.

When the operation of the carbon dioxide recovery device 2 is started, the rich solution 301 heated by the absorption tower 101 (rich solution 302) and a portion of the lean solution 319 heated by heat-exchange in the regenerative heat exchange device 103 are returned back to the regeneration tower 102. Therefore, the inside of the regeneration tower 102 is heated, and the heat input of the reboiler 108 can be suppressed. Due to the amount returned back to the regeneration tower 102, the flow rate of the lean solution 319 (lean solution 320) provided to the cooling device 106 is reduced, and this can suppress the cooling power required for cooling in the cooling device 106.

Figure 5:
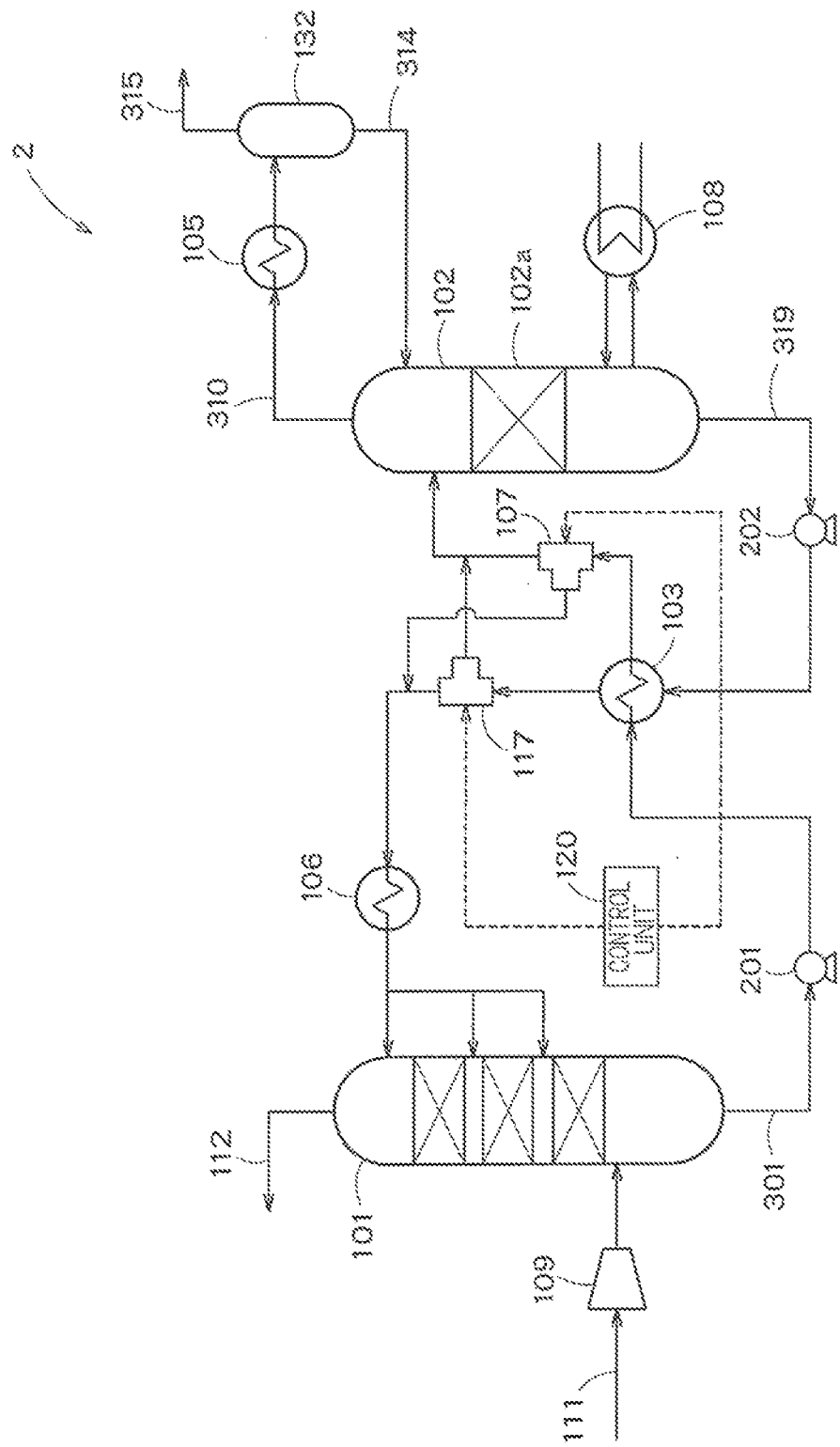
FIG. 5 is a schematic configuration diagram illustrating a carbon dioxide recovery device according to a modification.

As illustrated in FIG. 5, the diversion device 107 diverting the rich solution 301 may be provided between the regenerative heat exchange device 103 and the regeneration tower 102. Even in this configuration, the same effects as the second embodiment can be obtained.

The densimeter 121 and the concentration meter 122 as illustrated in FIGS. 2 and 3 may be provided in the carbon dioxide recovery device 2 as illustrated in FIGS. 4 and 5.

In the above embodiment, the discharge portion for the rich solution 301 discharged from the absorption tower 101 is configured to be arranged at the lower portion of the absorption tower 101. However, as long as it is configured to be arranged at a position lower than the providing port through which the absorbing solution is provided to the absorption tower 101, it may be arranged at any position such as a middle stage portion of the absorption tower 101, and it may be possible to configure to discharge all or some of the solution from multiple discharge ports. The above is also applicable to the regeneration tower 102. As long as the discharge port is configured to be arranged at a position lower than the portion through which the absorbing solution is provided to the regeneration tower 102, the discharge port can be arranged at any position and it may be possible to configure to discharge all or some of the solution from multiple discharge ports.

(Third Embodiment)

Figure 6:
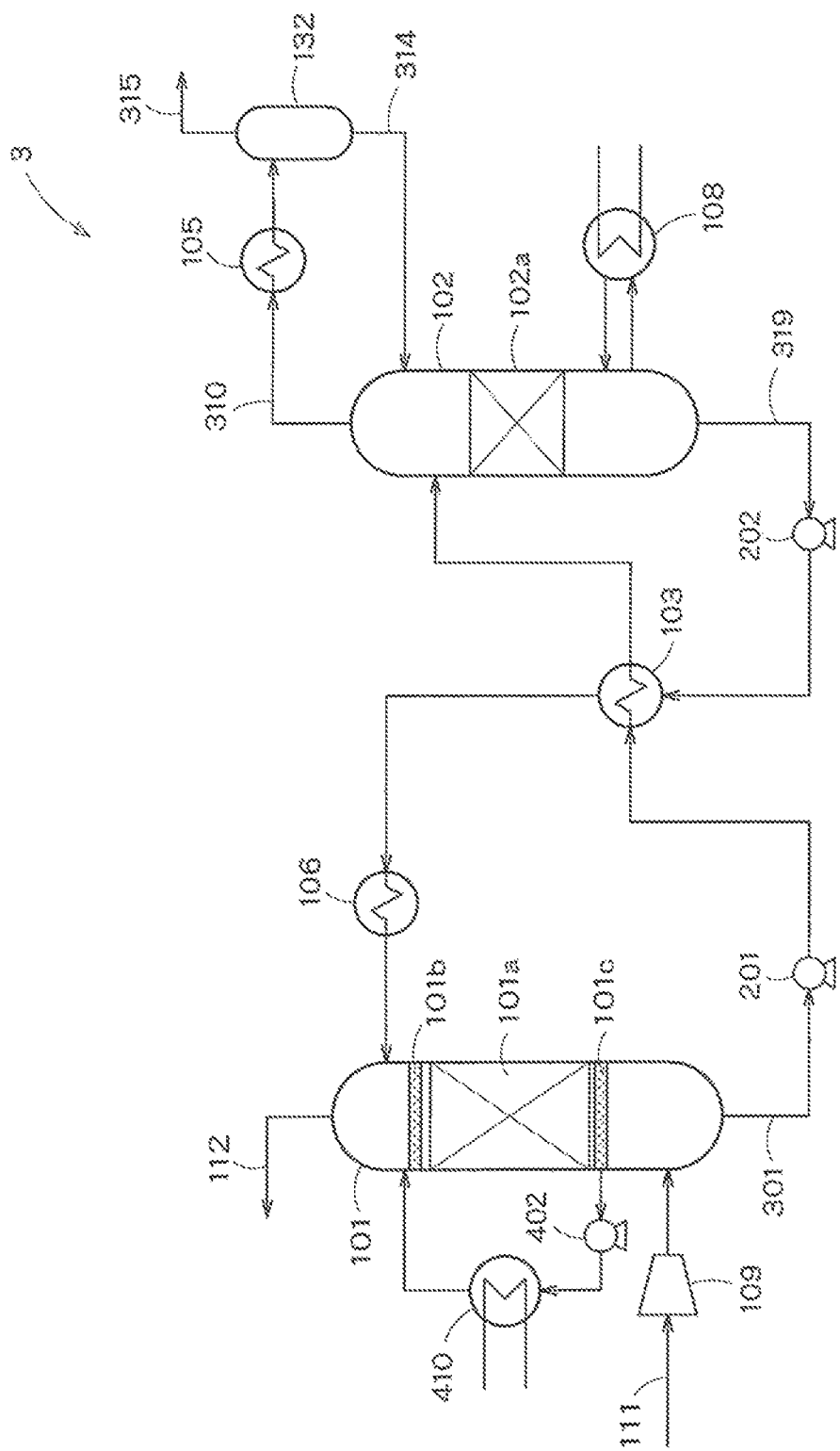
FIG. 6 is a schematic configuration diagram illustrating a carbon dioxide recovery device according to a third embodiment.

FIG. 6 illustrates a schematic configuration of a carbon dioxide recovery device 3 according to a third embodiment. In the carbon dioxide recovery device 1 according to the first embodiment illustrated in FIG. 1 and in the carbon dioxide recovery device 2 according to the second embodiment illustrated in FIG. 4, a part of the rich solution 301 discharged from the absorption tower 101 is diverted by the diversion device 107, and the rich solution diverted by the diversion device 107 and the lean solution after the heat exchange in the regenerative heat exchange device 103 are cooled by a cooling device 106 and are then returned to the absorption tower 101.

In contrast, in a carbon dioxide recovery device 3 according to the present embodiment, a part of absorbing solution is extracted from a lower portion of an absorption tower 101, the extracted absorbing solution is cooled by a cooling device 410, and the cooled absorbing solution is returned to an upper portion of the absorption tower 101. Description of a configuration similar to that of the carbon dioxide recovery device 1 according to the first embodiment illustrated in FIG. 1 is omitted.

As illustrated in FIG. 6, the absorbing solution (lean solution) having passed through a cooling device 106 is supplied to the upper portion of the absorption tower 101, and is uniformly supplied to a gas-liquid contact layer 101a by a dispersion device 101b. The gas-liquid contact layer 101a is, for example, a packed bed or a tray. In the gas-liquid contact layer 101a, carbon dioxide-containing gas 111 supplied from the lower portion of the absorption tower 101 and the absorbing solution flowing from the upper portion are subjected to gas-liquid contact, and carbon dioxide is absorbed by the absorbing solution.

The absorbing solution (rich solution) having passed through the gas-liquid contact layer 101a and having absorbed the carbon dioxide is collected by a collector 101c, and a part of the absorbing solution is extracted from the absorption tower 101 by a pump 402.

The absorbing solution extracted from the absorption tower 101 is cooled by the cooling device 410. The cooling device 410 can be any means as long as one can cool the absorbing solution.

The absorbing solution cooled by the cooling device 410 is supplied to the upper portion of the absorption tower 101, joins the absorbing solution having passed through the cooling device 106, and is supplied to the gas-liquid contact layer 101a through the dispersion device 101b.

As described above, a part of the absorbing solution circulates in the absorption tower 101 and the cooling device 410. Therefore, absorbing solution having low reaction activity, which cannot absorb much carbon dioxide because it includes much carbon dioxide, is continuously provided to the absorption tower 101 at a low temperature. Accordingly, this can prevent rapid heat generation in the absorbing solution due to the carbon dioxide absorption reaction in the absorption tower 101. Note that it is desirable to adjust the liquid volume that passes through the cooling device 106 in order to allow more absorbing solution having low reaction activity to circulate in the absorption tower 101.

In addition, the present embodiment is not only capable of preventing the above-described rapid heat generation but also capable of reducing the absorbing solution volume heated by a reboiler 108 and facilitating the dispersion reaction of carbon dioxide when L/G defined by the following expression is low.

$$L/G = \text{(the mass flow rate of the absorbing solution supplied to the absorption tower)/(the carbon dioxide-containing gas mass flow rate)}$$

When the L/G is high, the diameter of piping in which the absorbing solution flows becomes large and a liquid-delivery pump grows in size. Meanwhile, in the absorption tower 101, when the L/G is low, the temperature of the absorption tower 101 is increased due to heat generation associated with the carbon dioxide absorption reaction because the absorbing solution flow rate is small, and the carbon dioxide absorption efficiency is deteriorated. Therefore, it is desirable to decrease the L/G in the carbon dioxide recovery device as a whole and to increase the L/G in the absorption tower 101.

In the present embodiment, a part of the absorbing solution is extracted from the lower portion of the absorption tower 101, and is cooled and returned to the upper portion of the absorption tower 101. Accordingly, the volume of the absorbing solution that passes through the gas-liquid contact layer 101a can be increased compared with the volume of the absorbing solution supplied to the absorption tower 101 through the cooling device 106. Therefore, the L/G can be increased only within the absorption tower 101 without increasing the L/G in the carbon dioxide recovery device as a whole, so that the heat generation of the absorbing solution in the absorption tower 101 can be suppressed while the recovery efficiency of carbon dioxide can be enhanced.

In addition, an impact on the environment or on creatures due to scatter of the absorbing solution components accompanying carbon dioxide-removed gas 112 has become a problem. However, according to the present embodiment, the exhaust gas flowing in an interior of the absorption tower 101 can be efficiently cooled by supplying the absorbing solution cooled by the cooling device 410 to the upper portion of the gas-liquid contact layer 101a, and the absorbing solution components included in the carbon dioxide-removed gas 112 can be reduced.

While, in the present embodiment, a part of the absorbing solution collected by the collector 101c is extracted, is cooled by the cooling device 410, and is supplied above the dispersion device 101b, the supply place and the extraction place of the absorbing solution are not limited to the above embodiment, and any place can be employed as long as the supply place of the absorbing solution after cooling is higher than the extraction place of the absorbing solution.

Figure 7:
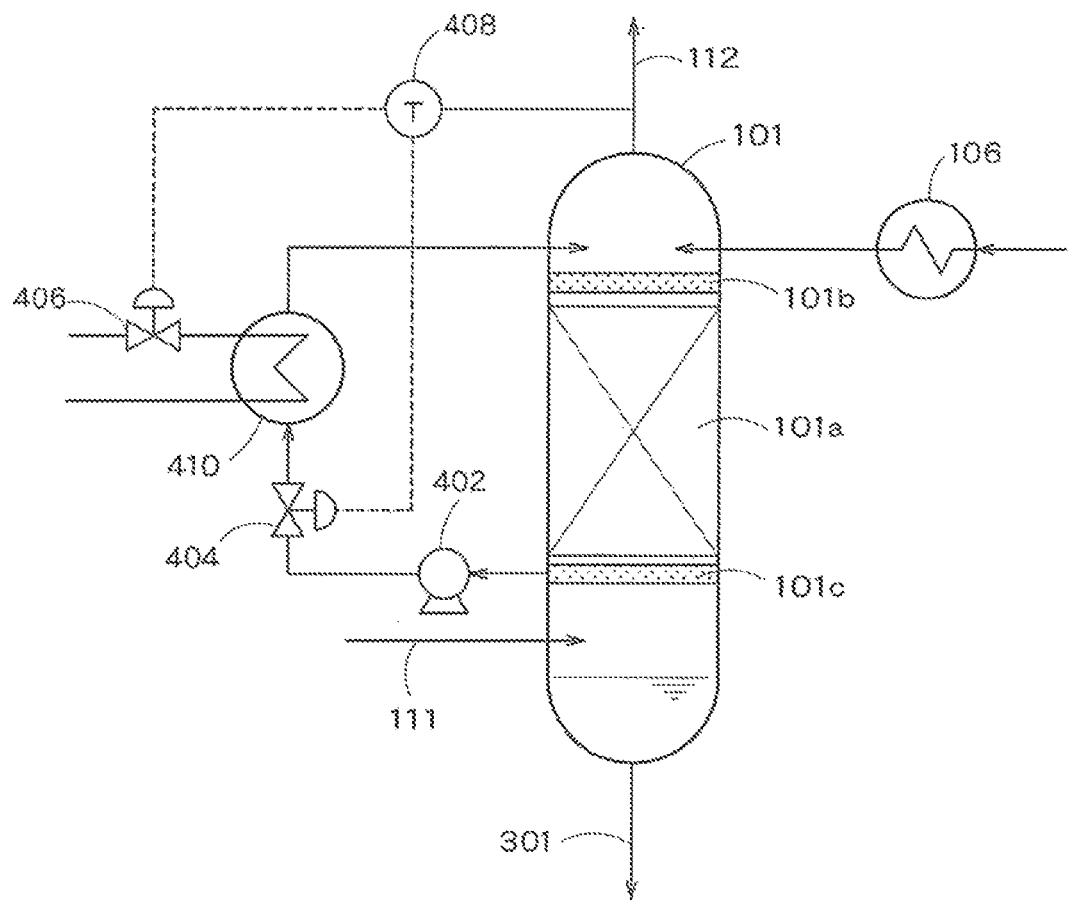
FIG. 7 is a schematic configuration diagram illustrating a main part of a carbon dioxide recovery device according to a modification.

As illustrated in FIG. 7, a valve 404 provided between the pump 402 and the cooling device 410, a valve 406 provided in piping that supplies a cooling medium to the cooling device 410, and a temperature sensor 408 that measures the temperature of the carbon dioxide-removed gas 112 may be further provided in the carbon dioxide recovery device 3. The openings of the valves 404 and 406 are adjusted based on a measurement result of the temperature sensor 408, and the flow rate of the cooling medium to be supplied to the cooling device 410 and the volume of the absorbing solution to be extracted from the absorption tower 101 is controlled. For example, when the measurement result of the temperature sensor 408 is a predetermined value or more, it is determined that the temperature in the interior of the absorption tower 101 is high, and either the flow rate of the cooling medium to be supplied to the cooling device 410 is increased or the volume of the absorbing solution to be extracted from the absorption tower 101 is increased, so that the temperature of the absorbing solution to be supplied to the absorption tower 101 is decreased. The adjustment of the openings of the valves 404 and 406 may be automatically adjusted by feedback control such as PID control, or may be manually adjusted by an on-site operator.

(Fourth Embodiment)

FIG. 8 illustrates a schematic configuration of an absorption tower of a carbon dioxide recovery device according to a fourth embodiment. The configuration of the carbon dioxide recovery device that is not illustrated in FIG. 8 is similar to that of the above-described third embodiment illustrated in FIG. 6, and therefore, description is omitted.

As illustrated in FIG. 8, an absorption tower 101 includes three gas-liquid contact layers $101a\_1$, $101a\_2$, and $101a\_3$, and the gas-liquid contact layer $101a\_2$ is provided above the gas-liquid contact layer $101a\_1$. Further, the gas-liquid contact layer $101a\_3$ is provided above the gas-liquid contact layer $101a\_2$.

A dispersion device $101b\_1$ and a collector $101c\_1$ are provided between the gas-liquid contact layer $101a\_1$ and the gas-liquid contact layer $101a\_2$. Further, a dispersion device $101b\_2$ and a collector $101c\_2$ are provided between the gas-liquid contact layer $101a\_2$ and the gas-liquid contact layer $101a\_3$. Further, a dispersion device $101b\_3$ is provided above the gas-liquid contact layer $101a\_3$.

Absorbing solution (lean solution) having passed through a cooling device 106 is supplied to an upper portion of the absorption tower 101, and flows in the gas-liquid contact layers $101a\_3$, $101a\_2$, and $101a\_1$ in sequence. Carbon dioxide-containing gas 111 supplied from a lower portion of the absorption tower 101 ascends in an interior of the absorption tower 101. In the gas-liquid contact layers $101a\_1$, $101a\_2$, and $101a\_3$, the carbon dioxide-containing gas 111 and the absorbing solution are subjected to gas-liquid contact, and carbon dioxide is absorbed in the absorbing solution.

The absorbing solution supplied to the upper portion of the absorption tower 101 is uniformly supplied to the gas-liquid contact layer $101a\_3$ by the dispersion device $101b\_3$. The absorbing solution having passed through the gas-liquid contact layer $101a\_3$ is collected by the collector $101c\_2$, and is then uniformly supplied to the gas-liquid contact layer $101a\_2$ by the dispersion device $101b\_2$. The absorbing solution having passed through the gas-liquid contact layer $101a\_2$ is collected by the collector $101c\_1$, and is then uniformly supplied to the gas-liquid contact layer $101a\_1$ by the dispersion device $101b\_1$.

A part of the absorbing solution (rich solution) collected by the collector $101c\_1$ is extracted from the absorption tower 101 by a pump 502. The absorbing solution extracted from the absorption tower 101 is cooled by a cooling device 510.

The absorbing solution cooled by the cooling device 510 is supplied to the collector $101c\_2$ through piping 520 and 522, joins the absorbing solution having passed through the gas-liquid contact layer $101a\_3$, and is supplied to the gas-liquid contact layer $101a\_2$ through the dispersion device $101b\_2$.

Further, a part of the absorbing solution cooled by the cooling device 510 is supplied to the gas-liquid contact layer $101a\_1$ through piping 524 and the dispersion device $101b\_1$. A valve 508 is provided at the piping 524.

A temperature sensor 512 and a valve 506 are provided at the piping 520. The temperature sensor 512 measures the temperature of the absorbing solution after being cooled by the cooling device 510. A valve 504 is provided at piping that supplies a cooling medium to the cooling device 510, and the opening of the valve 504 is controlled based on a measurement result of the temperature sensor 512. Accordingly, the temperature of the absorbing solution after being cooled by the cooling device 510 can be controlled to be a desired value.

Further, a temperature sensor 514 that measures the temperature of the gas-liquid contact layer $101a\_2$ is provided. The opening of the valve 506 is controlled based on a measurement result of the temperature sensor 514. Accordingly, the temperature of the gas-liquid contact layer $101a\_2$ can be controlled to be a desired value.

A liquid level sensor 516 that measures the liquid depth in a reservoir of the collector $101c\_1$ is provided at the collector $101c\_1$. The opening of the valve 508 is adjusted so that a measurement result of the liquid level sensor 516 is constant. Accordingly, a flow rate of the absorbing solution that downwardly flows in the gas-liquid contact layer $101a\_3$ and a flow rate of the absorbing solution to be supplied to the gas-liquid contact layer $101a\_1$ can be uniformly maintained.

As described above, a part of the absorbing solution circulates in the gas-liquid contact layer $101a\_2$ and the cooling device 510. Therefore, absorbing solution having low reaction activity, which cannot absorb much carbon dioxide because it includes much carbon dioxide, is continuously provided to the gas-liquid contact layer $101a\_2$ at a low temperature. Accordingly, this can prevent rapid heat generation in the absorbing solution due to the carbon dioxide absorption reaction in the gas-liquid contact layer $101a\_2$.

In addition, a part of the absorbing solution cooled by the cooling device 510 is supplied to the gas-liquid contact layer $101a\_1$, so that the absorbing solution that downwardly flows in the gas-liquid contact layer $101a\_1$ is prevented from increasing the temperature, and the absorption reaction of carbon dioxide can be facilitated.

In the above-described third and fourth embodiments, a spray or a perforated plate can be used as the dispersion device. Alternatively, the dispersion device may be omitted and the absorbing solution may be directly supplied to the gas-liquid contact layer.

According to at least one of the embodiments explained above, rapid heat generation in the absorbing solution can be prevented, and this allows stable operation.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A carbon dioxide recovery device comprising:
   an absorption tower configured to cause carbon dioxide-containing gas to come in contact with absorbing solution and generate a first rich solution by absorbing carbon dioxide from the carbon dioxide-containing gas, and then to discharge the first rich solution from a first place on the absorption tower;
   a first diversion device configured to divide the first rich solution discharged from the absorption tower into a second rich solution and a third rich solution;
   a regeneration tower configured to heat the second rich solution, to disperse steam containing carbon dioxide, and to generate a lean solution from which carbon dioxide has been removed;
   a heat exchanging device configured to receive one of the first rich solution and the second rich solution and exchange heat between the lean solution and the received one of the first and second rich solution; and
   a cooling device configured to cool the third rich solution from the first diversion device and at least a portion of the lean solution supplied from the heat exchanging device, the third rich solution and at least the portion of the lean solution being merged and supplied from the cooling device to a second place on the absorption tower that is higher than the first place.

2. The carbon dioxide recovery device according to claim 1,
   wherein the heat exchanging device exchanges heat between the lean solution and the second rich solution, and supplies the second rich solution after the heat exchange to the regeneration tower.

3. The carbon dioxide recovery device according to claim 2, further comprising a control unit configured to adjust a diversion ratio at the first diversion device,
   wherein the control unit reduces a flow rate of the third rich solution from the first diversion device after a predetermined time passes after a start of introduction of the carbon dioxide-containing gas to the absorption tower.

4. The carbon dioxide recovery device according to claim 3, further comprising a densimeter configured to measure density of the first rich solution,
   wherein the control unit calculates a carbon dioxide content of the first rich solution from a measurement result of the densimeter and adjusts the diversion ratio at the first diversion device based on a comparison between the calculated carbon dioxide content and a predetermined value.

5. The carbon dioxide recovery device according to claim 3, further comprising a concentration meter configured to measure concentration of carbon dioxide contained in the carbon dioxide-containing gas,
   wherein the control unit increases the flow rate of the third rich solution from the first diversion device when the measured concentration of carbon dioxide from the concentration meter is equal to or greater than a predetermined value.

6. The carbon dioxide recovery device according to claim 2, further comprising a second diversion device configured to return a part of the lean solution to the regeneration tower after the lean solution has passed through the heat exchanging device.

7. The carbon dioxide recovery device according to claim 1, further comprising:
   a second diversion device configured to divide lean solution output from the heat exchanging device into a second lean solution and a third lean solution,
   wherein the first diversion device divides the first rich solution after the first rich solution has passed through the heat exchanging device,
   the second rich solution and the second lean solution are supplied to the regeneration tower, and
   the cooling device cools the third rich solution and the third lean solution, and supplies the cooled third rich and lean solutions as a merged flow to the second place on the absorption tower.

8. The carbon dioxide recovery device according to claim 7, further comprising a control unit configured to adjust diversion ratios at the first diversion device and the second diversion device,
   wherein the control unit reduces flow rates of the third rich solution from the first diversion device and the second lean solution from the second diversion device after a predetermined time passes after a start of introduction of the carbon dioxide-containing gas to the absorption tower.

9. A carbon dioxide recovery method comprising:
   introducing carbon dioxide-containing gas into an absorption tower, causing the carbon dioxide-containing gas to come into contact with absorbing solution, and generating a first rich solution by absorbing carbon dioxide into the absorbing solution;
   dividing the first rich solution discharged from a first place of the absorption tower into a second rich solution and a third rich solution;
   exchanging heat between a lean solution and one of the first and second rich solutions;
   heating the second rich solution, dispersing steam containing the carbon dioxide, and generating the lean solution by removing carbon dioxide from the second rich solution in a regeneration tower;
   merging the third rich solution and at least a portion of the lean solution after the lean solution has exchanged heat with the one of the first or second rich solutions;
   cooling the third rich solution and merged portion of the lean solution; and
   after the cooling, supplying the third rich solution and the merged portion of the lean solution to a second place on the absorption tower that is higher than the first place of the absorption tower.

10. The carbon dioxide recovery method according to claim 9, further comprising:
    exchanging heat between the lean solution and the second rich solution.

11. The carbon dioxide recovery method according to claim 10, further comprising:
    reducing a flow rate of the third rich solution after a predetermined time passes from a start of introduction of the carbon dioxide-containing gas to the absorption tower.

12. The carbon dioxide recovery method according to claim 9, further comprising:
    exchanging heat between the lean solution and the first rich solution;

dividing the first rich solution into the second rich solution and the third rich solution after exchanging heat with the lean solution;
dividing the lean solution into a second lean solution and a third lean solution after exchanging heat with the first rich solution;
supplying the second rich solution and the second lean solution to the regeneration tower; and
cooling the third rich solution and the third lean solution, and supplying the third rich solution and the third lean solution to the second place of the absorption tower.

* * * * *